Sept. 15, 1964   W. W. KLEIN, JR., ETAL   3,149,302
INFORMATION SELECTION PROGRAMMER EMPLOYING RELATIVE
AMPLITUDE, ABSOLUTE AMPLITUDE AND TIME COHERENCE
Filed Sept. 28, 1959   6 Sheets-Sheet 4

INVENTORS
WALTER W. KLEIN, JR.
LEE P. STEPHENSON
BY
ATTORNEYS

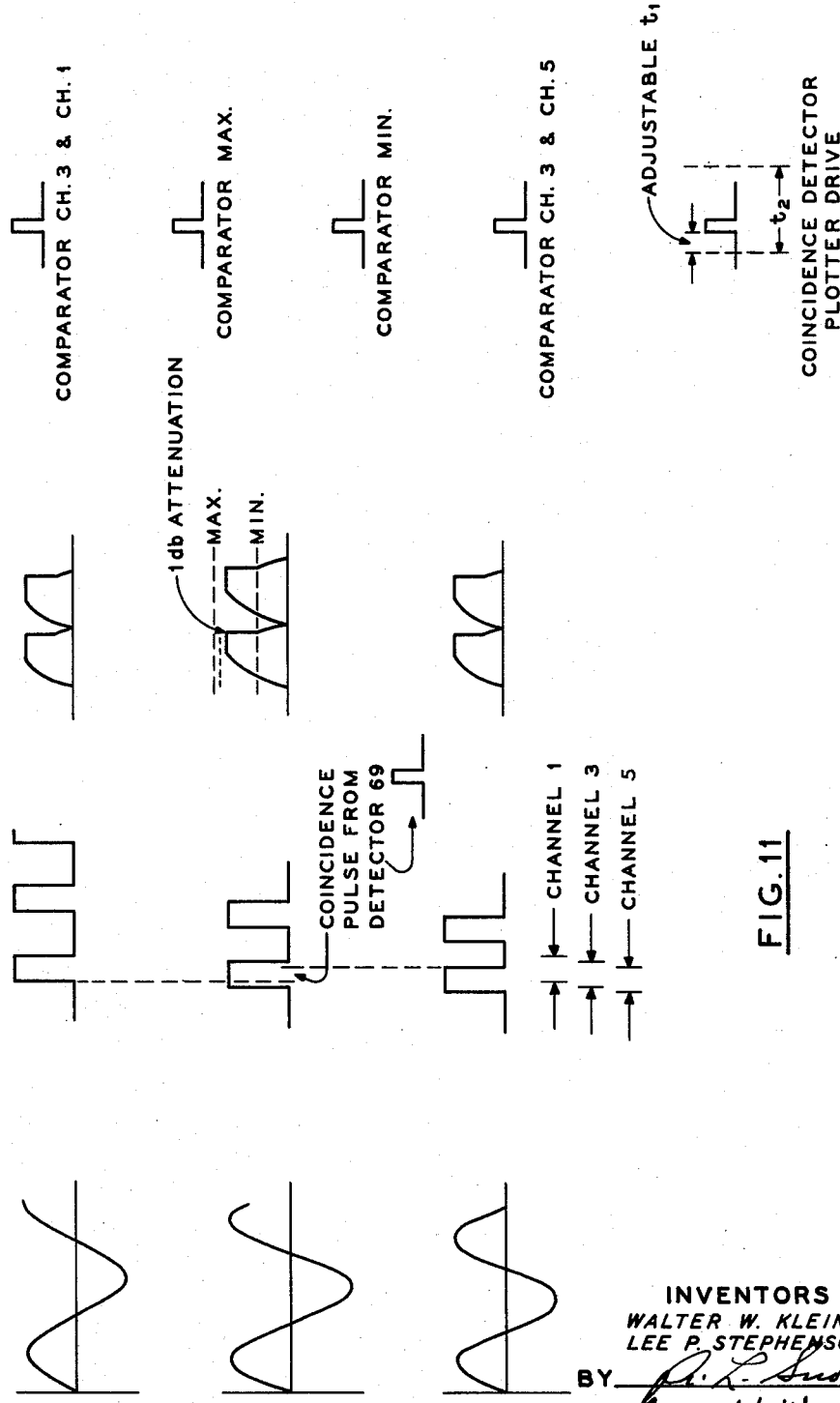

United States Patent Office 3,149,302
Patented Sept. 15, 1964

3,149,302
INFORMATION SELECTION PROGRAMMER EMPLOYING RELATIVE AMPLITUDE, ABSOLUTE AMPLITUDE AND TIME COHERENCE
Walter W. Klein, Jr., and Lee P. Stephenson, Fullerton, Calif., assignors to California Research Corporation, San Francisco, Calif., a corporation of Delaware
Filed Sept. 28, 1959, Ser. No. 842,621
26 Claims. (Cl. 340—15.5)

This invention relates to control of a plotting or display device, and more particularly to an apparatus for programming the energization of a display device intended to plot at least portions of a plurality of information traces where each trace contains information along its time axis and where at least several adjacent traces may contain indications of common information. The invention has particular application to an apparatus for selecting the most accurate directional identification of authentic seismic events appearing on a plurality of adjacent directional seismic traces. Directional seismic traces, as hereinafter more fully defined, contain events identifying reflecting interfaces within an earth formation as indicated by signal excursions along the time axis of the traces. These events usually appear on a plurality of adjacent traces at substantially the same elapsed time and may be compared to each other and to fixed acceptance criteria to permit selection of the most accurate directional identification of the reflecting interfaces within the earth formation being surveyed.

In the copending application of Lee P. Stephenson for "Automatic Seismic Data Processing Method and Apparatus," Serial No. 803,906, filed April 3, 1959, the process of deriving directional seismic traces from conventional locational seismic data is described and a system is disclosed for the display of the directional seismic traces for interpretative analysis. In that copending application, an improved display of seismic data has been disclosed along with an explanation of how the improved display of selected data may greatly assist the interpretation of a geologic cross-section by eliminating from consideration essentially all seismic trace excursions that do not find adequate geophysical derivation. This application is directed to apparatus for automatically performing the selection or elimination operation as suggested in the aforementioned copending application.

The object of the present invention is an apparatus for selecting information correlations from a plurality of reproducible traces containing common information through the automatic application of correlation criteria to a plurality of said traces in a predetermined order.

A further object of the present invention is an apparatus for selecting information correlations from a plurality of reproducible traces containing common information through the application of time coincidence, relative amplitude and absolute amplitude criteria.

A further object of the present invention is a novel apparatus for performing the comparisons of the preceding objects.

Another object of the present invention is the provision of apparatus for continuously comparing adjacent directional seismic traces to detect the presence of correlations of common information within the adjacent traces and for selecting those portions of the compared traces that identify the most accurate indication of a reflecting interface for energization of a suitable plotting apparatus.

A further object of the present invention is an apparatus for programming a data plotter to provide for performance of a comparison of the input data at one time along the time axis of the input data while the energization to the plotter for display of the input data provides for display of the data during a period of time starting at a controlled time prior to, and ending at a controlled time after the comparison time.

Further objects and features of the present invention will be readily apparent to those skilled in the art from the specification and appended drawings illustrating certain preferred embodiments in which:

FIG. 11 is a wave form diagram representing the correlation and selection of information as performed by the apparatus of FIG. 1.

The apparatus of the present invention has particular application to the selecting of seismic events as contained within a plurality of related directional seismic traces. The invention is, however, not restricted to selection of events from seismic information as it may have application wherever information is conveyed in multiple trace forms and wherein the several traces in the muliple trace form contain indications of common information. The method of the invention and the apparatus to perform the method may be used whenever it is desired to select the most noteworthy or the most accurate indication of a source of information common to and found within each of several reproducible traces. The invention may, therefore, have application to the analysis of the information correlations contained in electric logs which normally include a self-potential log and a plurality of resistivity logs or other formation logs run as by raising or lowering a logging sonde into or out of a well bore, or in the correlation of reflection information concerning targets as might be encountered in a radar or underwater sound system. Another and more closely related source of common trace information would be in the audio sound ranging systems for the location of artillery batteries or of other sources of acoustic energy.

Figure 1:
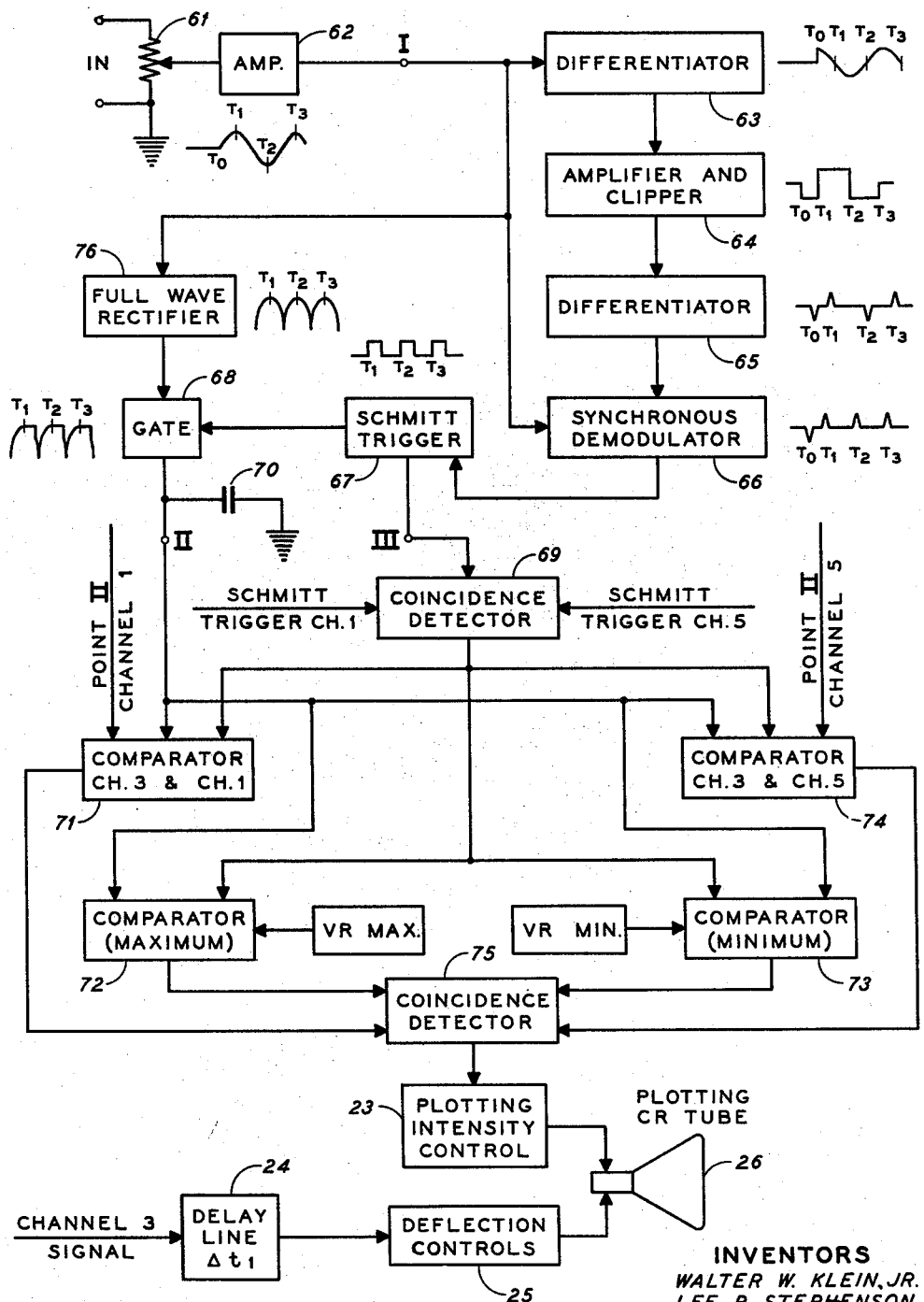
FIG. 1 is a block diagram of one form of apparatus for automatically selecting dominant indications of common information from a plurality of reproducible records.

In FIG. 1 of the drawings, a first form of apparatus for performing the method of the present invention is illustrated in simplified form as a single channel of a correlation or event-selecting apparatus. It should be understood that portions of at least two other substantially similar channels will be required to analyze and process completely the signals from a given reproducible trace. In the following description, the selection of an information correlation will be described on the basis of a comparison of three adjacent reproducible traces; however, it should be readily understood that any number of reproducible traces may be compared in the manner of the invention for the selection of the most accurate identification of the common information. Any increase in the number of adjacent traces compared in the selection of information correlations will, of course, be accompanied with a similar increase in the required number of channels similar to that shown in FIG. 1. It has been found in the use of the FIG. 1 apparatus for the selection of information correlations within directional seismic traces, that the use of three channels is successful in practice. Furthermore, it has been found that if directional traces separated from each other by an intermediate trace are compared, that is, by comparison of a first, third and fifth trace of a group of five, the selection of events may be accomplished with greater ease and without loss of accuracy. It can be shown theoretically that the probability of missing a meaningful event in a comparison of directional seismic traces is less when the first, third and fifth traces are compared than when three immediately adjacent traces are compared.

Figure 9:
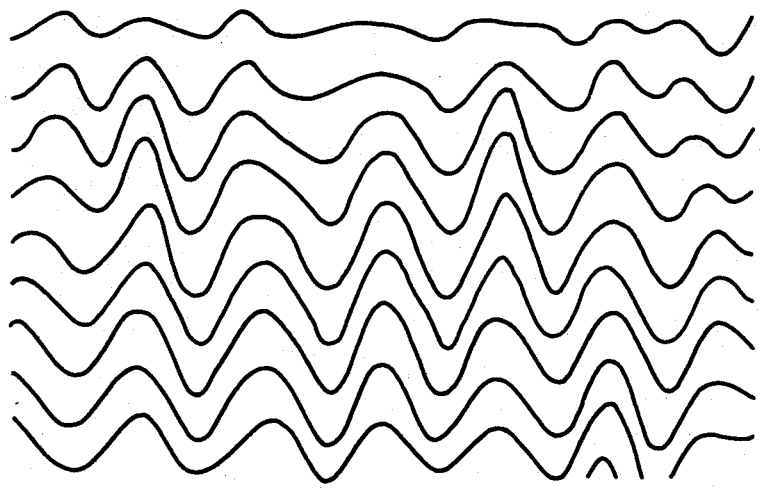
FIG. 9 is a portion of a record illustrating a plurality of reproducible directional seismic traces.
Figure 10:
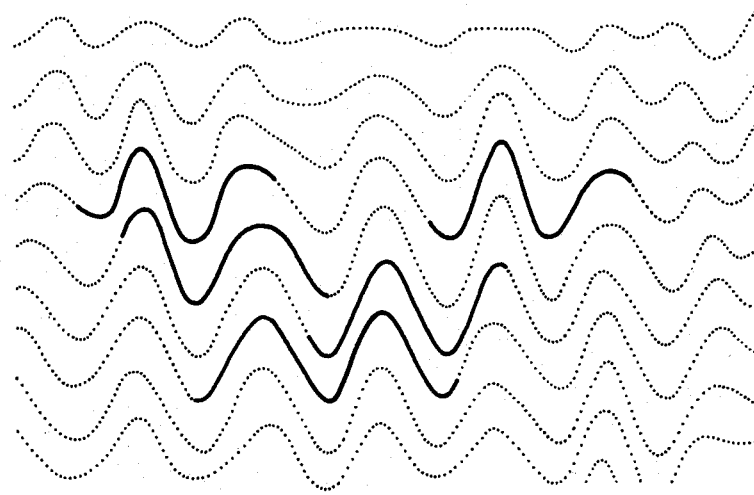
FIG. 10 is the record of FIG. 9 with the events selected with the apparatus of FIGS. 1 or 2.

An example of the information correlations that may be selected from a plurality of parallel traces is shown in FIGS. 9 and 10, illustrating a plurality of reproducible traces wherein several of the adjacent traces contain a common indication of correlatable information. The record of FIGS. 9 and 10 are actually a portion of a record of directional seismic traces, but it should be understood that a similar record could be of any origin where common information is contained in at least a group of the separate traces.

FIG. 9 illustrates the full record showing all of the information within the record of separate traces, as well as the trace excursions that contain no information and that can be most accurately attributed to noise either of an instrumentation source or of a nongeologic source such as wind noise or surface traffic noise, etc.

FIG. 10 illustrates, in bold display, those events along the separate traces that constitute indications of correlatable information within the full record of FIG. 9. The selected information displayed in FIG. 10 is theoretically all of the legitimate information within the directional traces due to the manner in which the directional traces are derived. The theoretical value of the information may be easily understood from the following description of the derivation of the directional seismic data within a conventional seismic record.

Directional seismic data is derived in the manner described in the aforementioned copending application wherein a seismic charge is exploded at or near the earth's surface to distribute into the earth formations the seismic energy derived from the explosion. The energy, as it encounters velocity discontinuities within the earth formation, is transmitted in part through the formation and reflected in part back to the earth's surface. At the earth's surface a plurality of surface geophones, constituting a geophone spread, detect the reflected seismic energy. The output of each of the geophones is recorded with respect to the time of initiation of the disturbance on an appropriate reproducible recording medium to establish a plurality of separate seismic traces that will hereinafter be referred to as locational seismic traces.

Figure 4:
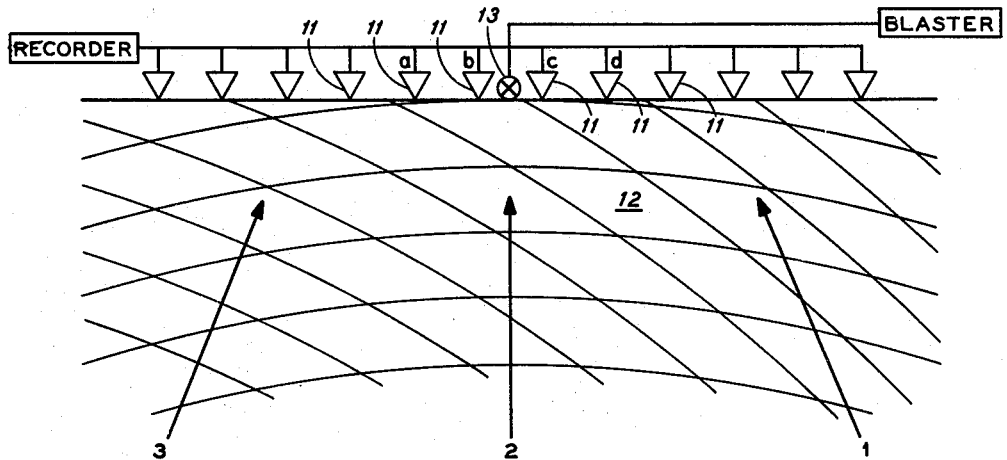
FIG. 4 is a sectional view through a geological mass illustrating representative ray paths for seismic energy reflected by subsurface acoustic impedance discontinuities.

In FIG. 4 a surface geophone spread is illustrated wherein a plurality of individual geophones 11 are spaced about a shot point 13 at the surface of an earth formation 12. Possible reflected energy paths within the formation 12 are illustrated by the arrows 1, 2 and 3. Arrow 1, for the purpose of the following description, is intended to indicate a typical direction from which no reflection energy is returning.

Figure 5:
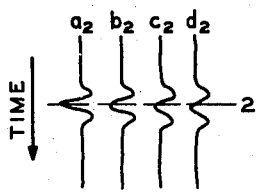
FIGS. 5 and 6 are portions of multitrace records of seismic reflection energy received as at the surface geophones of FIG. 4 for energy from separate reflectors.
Figure 6:
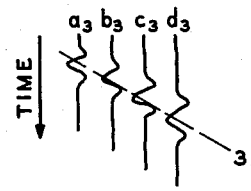

In FIGS. 5 and 6 representative seismic traces constituting the electrical signal output of geophones 11 designated $a$, $b$, $c$ and $d$ are illustrated with the signal traces of FIG. 5 illustrating typical traces for reflections arriving in the direction of arrow 2, and FIG. 6 illustrating typical traces for reflections arriving in the direction of arrow 3. It should be noted that in the FIG. 5 traces, each of the geophones detects the seismic energy at the same time, whereas in the FIG. 6 traces, trace $a_3$ receives the energy first and each of the subsequent traces $b_3$, $c_3$, $d_3$ receive their energy at some time differential after the first reception of energy at the geophone $a_3$.

Figure 7:
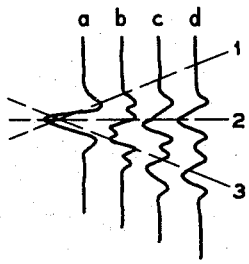
FIG. 7 is a composite of the records of FIGS. 5 and 6 and illustrates the combination of reflected energy from at least two subsurface reflectors.

FIG. 7 illustrates the composite grouping of the two signals of FIGS. 5 and 6 as the traces might appear if the reflected energy arrived along arrows 1 and 2 at the same time. Each of the wiggles of the traces $a$, $b$, $c$ and $d$ of FIG. 7 would be a combination of the information found in the traces of FIGS. 5 and 6 wherein trace $a$ would comprise the algebraic sum of the signals as illustrated in FIGS. 5 and 6, trace $d$ would illustrate the signals arriving at two different times such that neither signal would amplify or destroy portions of the other signal, and traces $b$ and $c$ would indicate intermixing of the two signals. FIG. 7 is a portion of representative seismic record of locational seismic traces.

Having now shown in a greatly simplified form how reflections of directionally distinct seismic energy would appear in separate seismic traces and how the reflections, if substantially simultaneous, would be combined to produce the conventional multitrace seismic record, the extraction of directional seismic traces from the conventional seismic record of locational seismic traces should be easily understood. The extraction of the directional information is, in effect, the reversal of the process of going from FIGS. 5 and 6 to FIG. 7 and is accomplished by adding the individual instantaneous signal amplitudes on each trace within a record while imposing a time lag between signals appearing on the adjacent traces from each separate surface geophone. The entire record of locational traces is passed through a reproducing means for each separate time lag and all traces are added with each pass of the record through the reproducer. The time lag between adjacent traces is adjusted for each pass of the record in accordance with a predetermined program so that after a prescribed plurality of full record reproductions and trace additions, a like plurality of new traces has been produced, each trace being a summation of the signals appearing across the full record and indicating a signal build-up where all traces in the original record contain events appearing across the record in the time lag relationship used for the individual signal additions.

Figure 8:
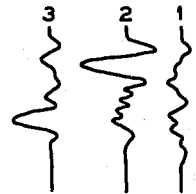
FIG. 8 is a portion of a record of directional seismic traces representing the reflections illustrated in FIG. 4.

The dotted lines designated 1, 2 and 3 in FIG. 7 illustrate three different time lag relationships across the record traces shown for summation of the signals. The effect of adding the signals in this manner is to pick out all signals that have a particular moveout relationship across the record or, in other words, all signals that have a consistent time delay incrementally along the time axis of the record from one trace to the next trace. It can be seen that if the signals are all combined in a manner normal to all of the traces, as shown by dotted line 2, that the signals of FIG. 5 will all be additive at the time that they appear along the record. With a similar reproduction across the record, the signals of FIG. 6 would produce no additive signal since each would appear at an incrementally different time along the entire record. Similarly, if the pickup heads of a reproducing device are adjusted in a manner to be sensitive to the signals as shown in FIG. 6, they will be less sensitive to signals appearing along the record as represented by the reflections indicated in FIG. 5. Each summation of the entire record may then be recorded to produce a plurality of separate traces, each trace indicating a summation of signals appearing across an entire record and having additive qualities as with the signals illustrated in FIGS. 5 and 6. Each of these separate traces may be constituted in the manner shown in FIG. 8 wherein the particularly additive signals of FIG. 6 are indicated in trace 3 and the signals of FIG. 5 are indicated in trace 2. As previously stated, the direction of arrow 1 shown in FIG. 4 is intended to illustrate a direction from which no signal is arriving and because of this, trace 1 of FIG. 8 illustrates random noise with no indication of an additive signal in the record.

It should be understood that the time lag or angular spacings between record summations as shown in FIG. 7 are merely illustrative of those used in the manner of deriving directional seismic trace information from a conventional seismic record and it should be understood that between traces 1 and 2 there might be many additional record summations. When the additional record summations have been made, FIG. 8 would be constituted by a plurality of signals illustrating a build-up of the event shown in trace 2 at both sides of the trace, with the traces to the sides of trace 2 indicating the reflection with lesser amplitude but at generally the same signal configuration, the same occurrence time along the trace, and the same phase.

Theoretically, all surface geophones within a spread of geophones will receive energy as a result of a reflection from a subsurface impedance discontinuity, and each should provide an output to be recorded as the usual wiggle on a trace of a seismic record of reflection energy. Each of the traces of the full record should, therefore, display a wiggle or event that may be identified in time and moveout across the full record. However, such an optimized record does not always exist and some conventional seismic records of the output of twenty-four surface geophones will indicate events on as few as twelve of the individual traces while many indicate events on something less than the full record. This failure to indicate events is due to many causes such as near surfaces acoustic traps including caverns and large boulders or, in the case of geophones near the shot point, of ground roll noise travelling along near the surface of the earth formation being surveyed. This lack of events across an entire record does not alter the ability of this record summation method to detect fragmentary events since any correlation across the record, as the various time-lagged summations are recorded, will result in an eventual recording of a signal wiggle within the directional seismic traces that may or may not be selected, in the manner of this invention, as acceptance criteria are applied.

On the other hand, as previously stated, random noise within the original locational seismic trace record will be unlikely to correlate and may, therefore, be easily excluded. The fragmentary events may correlate in a wider time spread along the several directional seismic traces than will full record events so as to appear to tilt across the assembly of directional traces; this, however, merely makes the selection of events by the method of the present invention more meaningful since even events of this type may be selected in accordance with adjustments of the selection criteria.

A portion of a full record of directional seismic traces is shown in plotted form in FIG. 9, where it may be seen that common reflection information will be contained in several of the adjacent traces. The number of adjacent traces on which a summation event will appear is determined by the adjustment of the time delay between record reproductions in the summation process and upon certain fixed parameters determined by the spacing of the geophones within the spread, the frequency of the seismic energy being received, etc. The relationship of time delay adjustment and geophone spread characteristics is fully explained in the aforementioned copending application. It is difficult to select the most accurate identification of a seismic event from a display of the type shown in FIG. 9. However, if only selected portions of the directional seismic traces were plotted or if the selected portions were accentuated over unselected portions of the record, it would then become possible to interpret the selected portions more easily or, if nothing more, it would become considerably easier to locate the selected portions. Furthermore, if the selected portions were to contain all of the truly significant seismic data within the plotted traces, the remainder of the unplotted traces or the unaccentuated portions could be disregarded and excluded from interpretation of the plotted record. Plotting of selected events is shown in FIG. 10 with reduced intensity provided on the remainder of the record, through dotting of the plotting of unselected portions.

The present invention provides a method for selecting the significant informational data from the background noise for appropriate energization of a plotting device to accomplish a display of the type shown in FIG. 10. The method and apparatus of the present invention is designed to apply selected criteria to identify correlations of informational data and, while the following explanation of the operation of the apparatus and the justification for the application of the selected criteria is directed toward the correlation of seismic data, it should be understood that the same criteria may be applicable to the identification of correlations in other multiple trace data.

Referring back to FIG. 8, it may be seen that certain events shown in traces 2 and 3 stand out in amplitude over other events when compared to portions of signals in the adjacent traces having the same time position along the record. As the time delayed summations of each of the separate geophone outputs begins to indicate a correlation of events along each of the original traces, the signal will show a build-up through a group of adjacent directional seismic traces. The signal reaches a maximum amplitude as the time phasing is adjusted to detect the most accurate time lag combination of the signals, this being also the most accurate directional identification of the reflecting interface. Since adjacent directional traces will display an event, if one exists, in the same polarity with the most directionally accurate directional trace containing the strongest or the highest amplitude signal, the selection of this most accurate trace may be accomplished by a relative amplitude comparison of the signals on adjacent traces. Furthermore, if more than two traces are compared, as for instance, three, it is possible to select a trace containing the highest amplitude signal by comparison to traces to both sides of the selected trace. In this manner, as traces are compared with traces adjacent to and at each side thereof, it is possible to select signals within the trace having higher amplitude than the signals occurring at substantially the same time on traces to either side thereof. These selected signals may then be used to control the energization of a plotting device for display of the trace undergoing comparison. The controlled plotting device may then display a seismic trace having events accentuated only when the amplitude comparison of neighboring traces indicates a higher amplitude signal in the trace being analyzed. This, then, is a correlation of information within the trace on the basis of relative amplitude comparison with the signals in adjacent traces.

Another less critical criterion for the selection of an event for plotting is the selection of events on absolute amplitude alone. In this form of amplitude selection, it should be apparent that with the plotting device adjusted to accept only those events exceeding a prescribed amplitude, it would be possible to eliminate all of the plotting of the random noise as shown in the three traces of FIG. 8, with the exception of the strongly indicated signals in traces 2 and 3.

It is also possible to accept only events having an amplitude within certain preset boundaries, thus setting both upper and lower absolute amplitude acceptance criteria. The rejection of events above a preset threshold is a legitimate selection criteria in that by so doing it is possible to eliminate at least some trace excursions that have the appearance of events but that are in reality multiples of other earlier events along the original seismic record having been produced in much the same manner as an echo is produced in above-surface sound transmissions. As an echo or multiple of an original indication of a subsurface seismic impedance discontinuity, these reflections may appear along the record at later and unjustifiable times, but they may be distinguished, in some cases, by the fact that they will be stronger than legitimate reflections of seismic energy that has travelled much longer distances into and out of the earth formations.

A third criterion for the selection of events for plotting is the application of a phase criterion or, more occurately, a time coincidence criterion. By this is meant that three or more traces are compared to see if the peaks and valleys (crests and troughs) of their respective signals occur at approximately the same time. In correlating seismic events, it is important to recognize that in actual practice one can hardly expect even the most meaningful peaks and valleys to occur at exactly the same time on several traces. This is often a result of interference between events, the fragmentary event recording previously defined and of imperfections in the geophones and of their associated equipment. Even with the probability of imperfections in geophones, the associated equipment and the existence of fragmentary events, it is still meaningful to require that events on adjacent directional seismic traces should occur with a prescribed time coherence period along each of the adjacent traces before a correlation can be considered to be a significant correlation of the events along the several records. This requirement is justified since the directional traces are all derived from combinations of the same traces and because it is unlikely that a major number of locational traces will show the same failure of response at the same time. Since each of the directional traces is a combination of all of the geophone outputs along the conventional seismic record, it is quite realistic to require that before an event may be picked for plotting, it must be identified by event signal oscillations on adjacent directional seismic traces that coincide within a prescribed time period with each other. The prescribed time period may be adjusted to select or reject as much or as little as is desired so that the fragmentary event problem previously defined may be relieved in the adjustment of selection limits.

Figure 2:
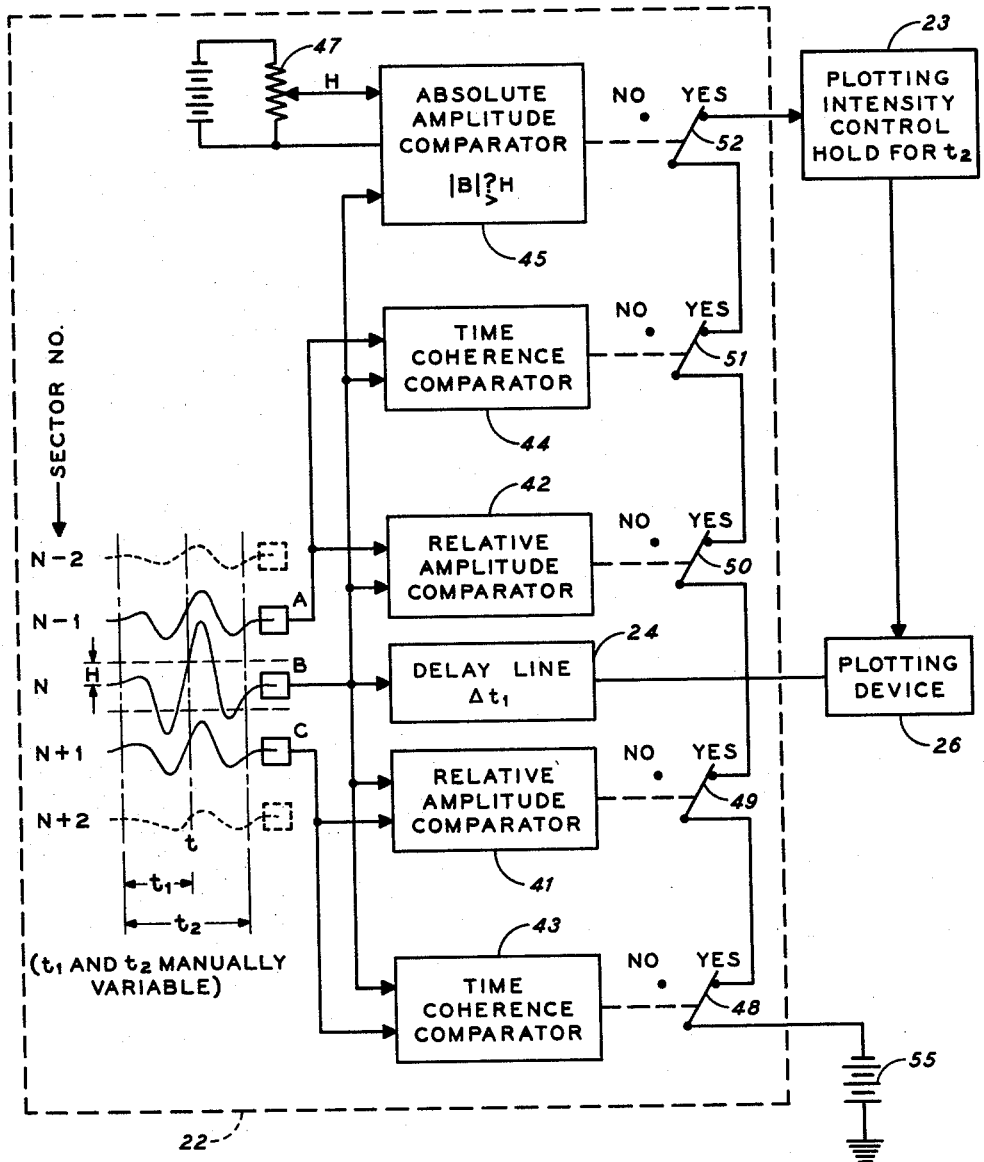
FIG. 2 is an alternative form of apparatus for performing the information selection of the present invention.

The three criteria for the selection of seismic events for display being established, the operation of the circuits of FIGS. 1 and 2 employed for the application of these criteria to the selection of events may now be understood. While the foregoing explanation of the reasons for the application of the criteria has been directed primarily to the selection of events within directional seismic traces, it should be readily understood that the same criteria would be applicable to the selection of events within other sorts of traces containing common information derived from other information sources.

By processing a multitrace record of traces having common information to apply amplitude or strength criteria, both singly and comparatively, as well as time coherence criteria to a preselected number of adjacent traces, a directional trace seismic record may be automatically picked to permit plotting or display of only meaningful seismic events. FIGS. 1 and 2 illustrate schematically two alternative forms that the automatic picking circuit may assume for the performance of the processing method in the present invention. For the purposes of simplicity of description, the processing system as herein illustrated, is confined to the processing of three directional seismic traces.

The circuit of FIG. 1 constitutes one channel of the automatic picking apparatus, there being at least two other substantially similar channels required to process the signals from the neighboring traces. In the description of this automatic picking circuit, the selection of events in a central trace of five traces will be described on the basis of a comparison of the first, third and fifth of the suite of five traces, rather than the central and two next adjacent, as will be described with respect to the circuit of FIG. 2.

The input to the single channel shown in FIG. 1, which is to be considered as channel three of channels one, three and five, is the directional trace on which correlations are to be identified. The signal is passed first through attenuator 61, which forms part of the relative amplitude selection system. The relative amplitude criterion is to be applied as follows:

The signal on trace 3 is to be plotted at full intensity if its amplitude satisfies both of the following conditions: (1) it must exceed the amplitude of trace 1, and (2) it must exceed the amplitude of trace 5. The excess must be in terms of a ratio, which in practice is conveniently expressed in decibel terms.

Actually, the circuit that follows attenuator 61 permits the signal of trace 3 to be plotted at full intensity if the output of attenuator 61 just exceeds the other signals by a very small difference. This difference is zero for practical purposes, so it may be said that the test is substantially a test for equality. In order that this equality represent a decibel or ratio difference, the signal coming from attenuator 61 has been reduced by attenuator 61 to just the required fraction of its original value. The attenuated output is passed through amplifier 62 and through the differentiator 63 so that the peaks and valleys of the signal (crests and troughs) will appear in a more useful form as cross-over points on the zero axis or at points where the signal goes from positive to negative. An amplifier and clipper 64 reverses the signal polarity and converts the differentiated signal to square waves as indicated in the schematic wave form diagrams in FIG. 11. The square waves go into differentiator 65 which produces positive and negative pulses at times corresponding to the cross-over times of the square waves.

At this point it will be understood that the positive and negative pulses coming from differentiator 65 correspond in time to the peaks and valleys of the signal that entered attenuator 61. The synchronous demodulator 66 compares pulses from differentiator 65 with the output of amplifier 62. When the sign of a pulse is the same as the sign of the signal from amplifier 62, the synchronous demodulator emits a positive pulse, regardless of whether that pulse when it entered the synchronous demodulator was positive or negative. However, when the sign of the pulse is different from that of the signal from amplifier 62, the synchronous demodulator passes that pulse as a negative pulse.

One object of the operation of synchronous demodulator 66 is to distinguish pulses that represent true peaks and valleys of the signal from pulses that represent sudden changes of the signal from a quiescent condition. Such a pulse is indicated in the schematic wave forms of FIG. 1 at $T_0$. Other objects of the synchronous demodulator will become apparent further on in this explanation.

The output from synchronous demodulator 66 is fed into the Schmitt trigger 67 that produces a square wave of predetermined duration, beginning at the time of a positive input pulse; it produces no output for a negative pulse. It will be appreciated that the predetermined duration of the square waves must be less than a half period of the dominant seismic frequency. The square waves from the Schmitt trigger are fed into the gate 68 which is polarized so that it is closed when the square wave is on, open when it is off. The impedances of the circuit including full wave rectifier 76, gate 68, capacitor 70, and the devices following capacitor 70, are such that when gate 68 is open, the voltage across capacitor 70 faithfully follows the rectified seismic signal. However, when gate 68 is closed, capacitor 70 maintains within, say, one percent, the voltage it had at the instant of closure. But in accordance with the explanation heretofore, gate 68 closes precisely at times corresponding to the peaks and valleys of the seismic signal. Therefore, the absolute amplitude of each peak and valley is retained across capacitor 70 for the predetermined time interval established by the Schmitt trigger.

It is convenient at this point to return to the consideration of what happens in the other channels of the system, those channels that process traces one and five. The circuitry in the first part of those channels is similar to that already discussed, with two exceptions: (1) the input attenuator 61 is absent, and (2) the seismic signal input to the synchronous demodulators in channels one and five does not come from the channel one and five amplifiers but from the channel three amplifier. In other words, the seismic signal inputs of the synchronous demodulators of all the channels are connected to point I of channel three. The synchronous demodulators of channels one and five behave similarly to their counterpart in channel three, that is, they produce positive pulses from input pulses of either sign when those pulses agree in sign with the seismic signal on channel three. They produce negative pulses from input pulses of either sign when those input pulses disagree in sign with the seismic signal on channel three. Therefore, it will be appreciated that the respective Schmitt triggers in channels one and five will be actuated only when peaks in those channels occur within the time intervals during which the channel three signal is positive, or when valleys in those channels occur within the time intervals during which the channel three signal is negative. Because the later comparisons are to be made only during the Schmitt trigger intervals, this prevents a peak on one channel being compared to a valley on another. However, it still permits peaks on channels one and five to be compared with peaks on channel three even when they are shifted with respect to the peaks on channel three by as much as a quarter of a period.

If ideal seismic records were being processed, it would not be necessary to provide for the comparison of peaks or valleys that were as much as a quarter period apart. However, in actual practice, the effects of differential geophone placements, differential geophone responses, and other non-ideal differential effects between the various information channels, reduce the coherence. During the processing of seismic records of good quality, it has been found that valid information may have a coherence as tight as a sixteenth of the dominant period. But during the processing of poor records, coherence as loose as a quarter period must be tolerated. In order that optimum amounts of noise may be rejected from records of various qualities, it is necessary to vary the coherence requirements. This variation is produced by varying the duration of the Schmitt trigger square waves.

From this point on in the description, it is to be understood that the three channels (one, three and five) merge as indicated in FIG. 1. There is no more duplication of apparatus in separate channels after each of the channels goes as far as points II and III in FIG. 1.

The outputs of the three Schmitt triggers are separately fed into coincidence detector 69. Detector 69 passes the coincident fraction of the square waves from the three channels. Because the starting times of the separate input square waves correspond to peaks or valleys in their respective channels, and because the operation of the synchronous demodulators has already insured that the waves from all three channels will represent either peaks or valleys, but not both, a coincidence of the square waves must represent time coherence of three peaks, or of three valleys. Furthermore, that time coherence must be such that the time between the first and last peaks is at least as short as the Schmitt trigger time interval. As mentioned already, the time coherence to be expected in seismic records, for valid events, varies with the quality of the records, and in accordance with the empirically determined quality, the Schmitt trigger time interval may be shortened or lengthened.

If there is no output from coincidence detector 69, none of the remaining parts of the selection circuitry comes into play, and whatever plotting of the signal is occurring at the very end of the processing is occurring at minimum intensity, which minimum intensity may actually be zero. However, if there is an output from coincidence detector 69, it activates the various following devices that determine whether the absolute and relative amplitude criteria are satisfied.

Most of the remaining devices in the circuitry are comparators, all of which perform a similar type of function and all of which have four terminals. Into two of the terminals are fed two voltages to be compared. A third terminal, the output terminal, delivers a positive or negative pulse, depending on which of the two voltages is greater, but the output pulse is delivered only when an interrogation pulse is sent into the fourth terminal. In the circuitry to be considered, the interrogation pulses are the already mentioned coincident fractions of square waves that come from coincidence detector 69.

Going back to capacitor 70, it will be recalled that the voltage at point II of each channel is held substantially constant at a peak maximum (or a valley minimum) voltage for the duration of each Schmitt trigger square wave. For convenience, let the point II voltages in channels one, three and five be called V(II 1), V(II 3), and V(II 5), respectively. The voltages V(II 1) and V(II 3) are fed into comparator 71. If V(II 3) is greater than V(II 1), comparator 71 emits a positive pulse when interrogated by coincidence detector 69. Similarly, voltages V(II 5) and V(II 3) are fed into comparator 74. If V(II 3) is greater than V(II 5), comparator 74 emits a positive pulse when interrogated by coincidence detector 69.

Voltage V(II 3) is fed also into comparators 72 and 73. In comparator 72, V(II 3) is compared with a predetermined reference voltage VR Max. If V(II 3) is less than VR Max., comparator 72 emits a positive pulse when interrogated by coincidence detector 69. In comparator 73 V(II 3) is compared with a predetermined reference voltage VR Min. If V(II 3) is greater than VR Min., comparator 73 emits a positive pulse when interrogated by coincidence detector 69.

The outputs from all of the comparators 71, 72, 73 and 74 are fed into coincidence detector 75, which produces a positive output pulse only when it receives positive pulses from all four comparators. So, a positive pulse from coincidence detector 75 means that all criteria have been satisfied, namely, that: (1) there is a predetermined time coherence between peak and peak, or valley and valley, on all three traces one, three and five, and (2) the peak (or valley) voltage of trace three lies between a predetermined maximum and minimum, and (3) the peak (or valley) voltage of trace three exceeds the peak (or valley) voltages of both traces one and five.

FIG. 11 illustrates representative wave forms in the analysis of three input signals using the apparatus of FIG. 1.

The foregoing description has now covered the application of criteria for selecting portions of the signal to be plotted with maximum intensity. It will be appreciated that in a seismic record where portions are found that satisfy the criteria, the portions are only fragmentary. That is, they will consist only of portions of the peaks and troughs of the signal. What is actually desired is not to examine just those fragmentary portions, but to examine all of each region of a trace where portions are found that satisfy the criteria. It is desired to see the full cyclic excursions of those parts of the signal, of which only fragments satisfy the criteria. It is further desired to examine those full cyclic excursions within their context. That is, when an interesting portion of a trace is found by the picking criteria, it is desired to see what happened in the build-up period immediately before that portion, and what will happen in the tailing-off period after that portion. Therefore, provision is made to plot each trace continuously from a certain predetermined time interval ahead of any point that satisfies the picking criteria until another predetermined time interval after any point that satisfies the picking criteria.

The desired anticipatory effect is obtained by feeding the signal to be plotted through delay line 24 for delaying the signal by an amount of time $\Delta t_1$. When the sensing devices find a point on a signal trace that satisfies the picking criteria, and when they in turn actuate the plotting device to plot at maximum intensity, the plotter handling the delayed signal will actually begin to plot with maximum intensity at that point of the trace that is a time interval $\Delta t_1$ ahead of the picked point.

The plotting of tailing-off regions after picked points is accomplished by a holding circuit in the plotting intensity control. This holding circuit maintains maximum plotting intensity for a time interval $t_2$ after each and any actuation pulse. It can be readily deduced that $t_2$ must exceed $t_1$ by whatever time interval it is desired to use for looking at the trailing-off region.

An alternative form of event selecting or picking apparatus is shown in FIG. 2. In the circuit illustrated in FIG. 2, the central trace is designated N, and traces above the central trace are designated N−1 and N−2, while traces below the central trace are designated N+1 and N+2. The analysis is of the traces N, N−1, and N+1. The circuit of FIG. 2 continuously applies the three criteria to identify correlations within the record for display purposes. These criteria are first, absolute amplitude established by the level designated H on trace N, relative amplitude wherein trace N is compared to traces N−1 and N+1, and time coherence wherein the algebraic signs of two pairs of signals are compared, and the sign agreement intervals are then compared for coincidence.

For the purposes of the schematic illustration, three separate heads are designated A, B, and C for reproducing signals of the separate traces. The outputs of the separate pickup heads are applied to comparator circuits indicated in FIG. 2 for the automatic identification of correlations in the input information. These circuits include a pair of relative amplitude comparators 41 and 42, a pair of time coherence comparators 43 and 44, and an absolute amplitude comparator circuit 45. Five separate switches 48, 49, 50, 51 and 52 are individually actuated by the five separate comparator circuits to implement the decision made by the picking circuitry. The switches 48 through 52 provide for an interruptable connection between a voltage source 55 and a plotting intensity control 23 so that if all of the series switches are in a closed position, the plotting intensity control 23 will be provided with a voltage for actuation of a maximum plotting beam intensity. The inputs to the absolute amplitude comparator 45 are the signal from the directional seismic trace being processed and the output from a voltage divider network 47. The absolute amplitude comparator 45 applies the acceptance level H for a signal and therefore selects signals by an absolute amplitude criterion. Comparator 45 may also provide for rejection of signals that exceed a maximum level since such signals are sometimes not desired. The relative amplitude comparator circuits 41 and 42 compare the average amplitude of the signal picked up by head B with the average amplitudes of signals picked up by heads A and C and constitute conventional comparator circuits. Comparator circuit 41 controls switch 49 to move the switch to a "yes" position if the signal from B is of a higher amplitude than the signal from C, and comparator circuit 42 provides similar control of switch 50 if the signal from B is larger than the signal from A. Comparators 41, 42 and 45 may constitute conventional comparator circuits and therefore require no specific circuit description.

The time coherence comparators 43 and 44 compare the two signals that enter them and cause their respective switches 48 and 51 to assume the "yes" position when the entering signals have the same algebraic sign. Each of these time coherence detectors may comprise, for example, an amplifier and clipper pair for each of the two input signals to produce square waves having the same time axis cross-over points as the entering signals, these square waves having identical amplitudes. The square waves may then be added and passed through a full wave rectifier. It will be appreciated that such an arrangement will produce square output pulses corresponding to the time intervals when the two input signals have the same sign, whether that sign is positive or negative. The square output pulses control the switches 48 and 51.

Figure 3:
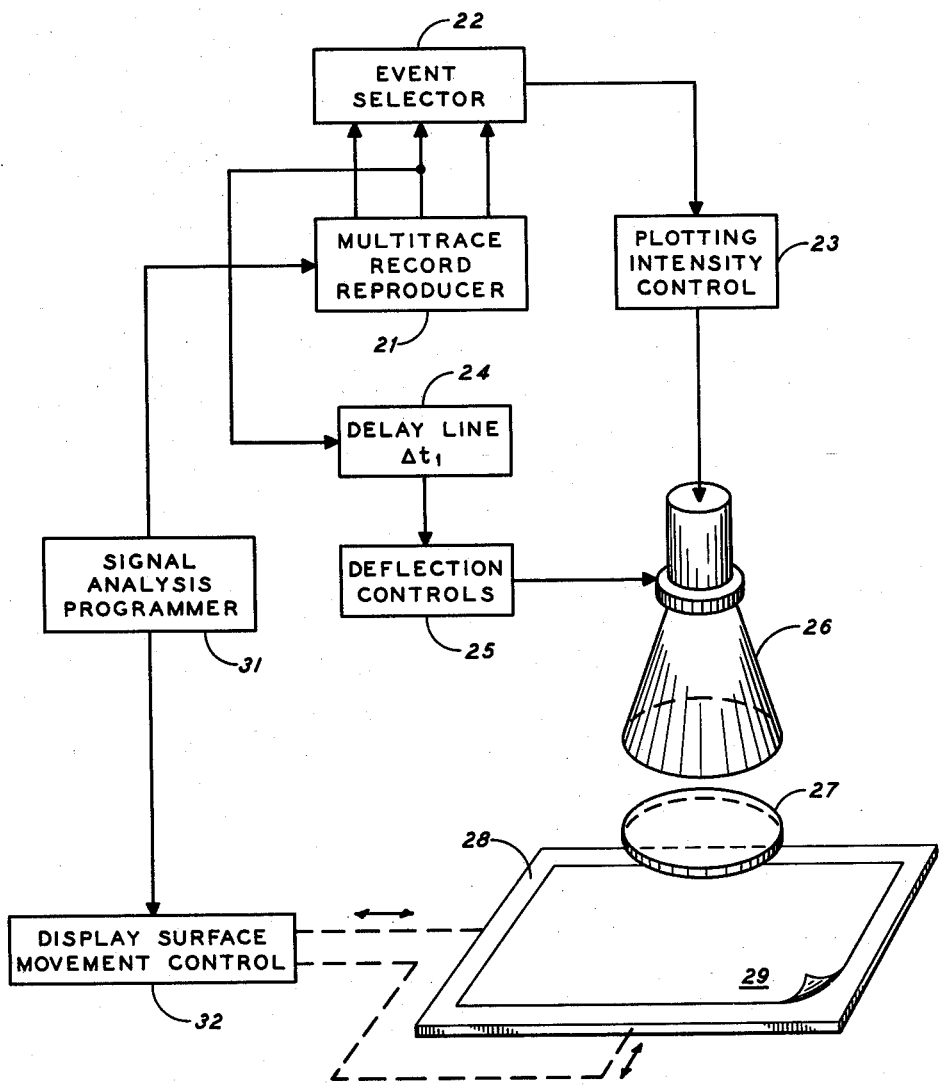
FIG. 3 is a block diagram of a plotting apparatus including control by the selection circuits of FIGS. 1 and 2.

A representative form for a plotting apparatus employing the information selection programmers of FIGS. 1 and 2 is illustrated in block diagram form in FIG. 3. It will be understood that the data that do not satisfy the picking criteria may be treated in at least two ways. They may be completely suppressed, that is, not plotted at all; or, they may be de-emphasized by some sort of fragmentary plotting, as with dotted or dashed lines as in FIG. 10, or they may be plotted with reduced intensity. In FIG. 3 a multitrace record reproducer 21 is employed to reproduce a plurality of the traces containing common information as, for instance, the directional seismic traces. The several reproduced traces are transmitted to the event selection programmer 22 containing one or the other of the circuits illustrated in FIGS. 1 or 2 wherein a comparison is made of the input records to select correlations and indications of common information. A portion of the output from the reproducer, constituting the trace to be compared with other traces in the programmer, is transmitted to delay line 24 where it is held for completion of the comparison within the programmer. When the programmer has identified a correlation for plotting, it will transmit the necessary energization to the plotter intensity control 23 for actuation of the plotting device, here illustrated as a cathode ray tube 26. The cathode ray tube will also have applied to its deflection apparatus the delayed signal from delay line 24 through deflection controls 25. The moving bright spot on the surface of the cathode ray tube will be focused by lens 27 and projected onto a movable plotting table 28 having a display surface 29 suitably positioned thereon. The display surface will, in this manner, reproduce the excursions of the electron beam in controlled intensity patterns as selected by the programmer 24.

The plotting table 28 will be moved in synchronism with the reproduction of the input records from the reproducer 21 as controlled by a signal analysis programmer 31 and as moved by the display surface movement control 32. The programmer 31 will select those records that are to be reproduced and compared in the programmer 22 and will position the display surface 29 in a two dimensional movement pattern to provide separate display areas for each trace as the correlation process is being performed. The display surface movement control may also be designed to provide other display patterns on the display surface 29 as, for instance, a migrated display of directional seismic traces as shown in the aforementioned copending application.

It should also be understood that the use of a cathode ray tube as the plotting device is merely representative of apparatus that may be employed to reproduce the selected information and that other forms of apparatus that may be intensity controlled may be used with equal success in the display of selected data. As illustrated in FIG. 10, the selected information may be accentuated in dominance while the remainder of the record may be plotted in some other form, or may be completely eliminated.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

We claim:

1. The method of automatically selecting the major indication of information representations within one of a plurality of signal traces wherein each of a plurality of said traces contain obscured indications of said information at substantially the same time period along the longitudinal time axis of said traces comprising the steps of sensing the instantaneous signal strength and signal polarity of a first of said plurality of traces, simultaneously sensing the instantaneous signal strength and polarity of at least two other of said plurality of traces substantially contiguous to said first trace, comparing the sensed signal strength of said first trace to each of said other traces to detect the occurrence of a sensed signal on said first trace stronger than the sensed signals on each of said other traces, comparing the polarity of said sensed signal on said first trace to the sensed signal on each of said other traces to detect electrical sign coincidence in said compared signals, and identifying said major representations in said first trace by the simultaneous detection of strength and sign coincidence through said comparisons.

2. The method of claim 1 plus the additional step of initiating said identification at a predetermined period prior to said detection and for a predetermined period after said detection.

3. The method of automatically selecting information representations within a plurality of directional seismic traces, each of said directional seismic traces being a correlation of seismic information derived from a plurality of related locational seismic traces, comprising the steps of sensing the instantaneous signal strength of events within a first of said directional seismic traces, comparing said sensed signal to the instantaneous signal strength of events occurring at substantially the same time on two other directional seismic traces symmetrical and substantially contiguous to said first trace, and identifying said representations within said first trace by the detection of a relative signal strength on said first trace stronger than the signal strength on each of said other traces.

4. The method of claim 3 with the additional step of initiating said identification from a predetermined period prior to the attainment of a maximum signal strength and for a predetermined period after the attainment of said maximum signal strength.

5. The method of selecting information representations within a plurality of directional seismic traces, each of said directional seismic traces being a correlation of seismic information within a related plurality of locational seismic traces, comprising the steps of sensing the instantaneous signal strength of events within a first of said directional seismic traces, comparing said sensed instantaneous signal strength to a first reference signal strength, comparing said sensed instantaneous signal strength to a second reference signal strength having a signal strength greater than said first signal strength, and identifying said representations within said first trace by detecting signals on said first trace stronger than said first reference signal and weaker than said second reference signal.

6. The method of claim 5 plus the additional step of initiating said identification at a predetermined period prior to said detection and for a predetermined period after said detection.

7. The method of selecting information representations within a plurality of directional seismic traces, each of said directional seismic traces being a correlation of seismic information within a related plurality of locational seismic traces, comprising the steps of comparing the instantaneous signal strength of a first of said traces with a reference signal strength, comparing the instantaneous signal of said first trace with the instantaneous signal at substantially the same time on at least two others of said traces symmetrical and substantially contiguous to said first trace, and identifying said representations within said first trace by the simultaneous detection of a signal strength on said first trace stronger than said reference signal and coinciding in sign with the instantaneous signal on each of said other traces.

8. The method of claim 7 plus the additional step of comparing said instantaneous signal strength of said first trace with a second reference signal strength, and identifying said representations by the simultaneous detection of a signal strength stronger than said first reference signal, weaker than said second reference signal, and coinciding in sign with the instantaneous signal on each of said other traces.

9. The method of claim 7 plus the additional step of initiating said identification at a predetermined period prior to said detection and for a predetermined period after said detection.

10. The method of claim 8 plus the additional step of initiating said identification at a predetermined period prior to said detection and for a predetermined period after said detection.

11. The method of selecting information representations within a plurality of directional seismic traces, each of said directional seismic traces being a correlation of seismic information within a related plurality of locational seismic traces, comprising the steps of comparing the instantaneous signal strength of an event on a first of said directional seismic traces with a reference signal strength and with the instantaneous signal strength of events occurring at substantially the same time on at least two other directional seismic traces symmetrical and substantially contiguous to said first trace, and identifying said representations within said first trace by the simultaneous detection of a signal strength stronger than said reference signal strength as well as a relative signal strength stronger than the instantaneous signal strength of events on said other traces.

12. The method of claim 11 plus the additional step of comparing said instantaneous signal strength to a second reference signal strength, and identifying said representations within said first trace by detecting signals stronger than said first reference signal and weaker than said second reference signal.

13. The method of claim 11 plus the additional step of initiating said identification at a predetermined period prior to said detection and for a predetermined period after said detection.

14. The method of claim 12 plus the additional step of initiating said identification at a predetermined period prior to said detection and for a predetermined period after said detection.

15. Apparatus for selecting information representations within a plurality of reproducible record traces containing indications of common directional information masked within nonrelated noise comprising: means for simultaneously producing electrical signals representing the instantaneous amplitude and polarity of each of said traces, means for comparing the absolute amplitude of a first of said traces with a preestablished reference, means for comparing the amplitude of said first trace with the amplitudes of preselected others of said traces, means for comparing the phase of said first trace with the phase of said preselected others of said traces, means operated by each of said comparing means upon the satisfaction of predetermined comparison criteria, and means for displaying said reproducible traces including means for accentuating information representations identified by simultaneous operation of all of said means operated by each of said comparing means.

16. Apparatus for selecting information representations within a plurality of reproducible record traces wherein at least one of said traces contains a predominant indication of said information and others of said traces contain lesser indications of said information comprising: means for producing an electrical signal representing the instantaneous amplitude and polarity of each of said traces, means for converting oscillations of said signals to pulses coinciding with the peaks of amplitude of said oscillations, said pulses having the same polarity as said oscillations, means for comparing the instantaneous polarity of said pulses of each signal oscillation within each of said traces with the signal of said one trace, a plurality of trigger circuits, means for gating separate ones of said trigger circuits only when said pulses within said others of said traces are in phase with the instantaneous polarity of said one trace, means for detecting coincidence in the gating of all of said separate trigger circuits, and control means operated only when said pulses on said one trace coincide in phase with said pulses on said other traces for selecting said information representations.

17. Apparatus for selecting information representations within a plurality of reproducible record traces wherein at least one of said traces contains a predominant indication of said information and others of said traces contain lesser indications of said information comprising: means for producing an electrical signal representing the instantaneous amplitude and polarity of each of said traces, means for converting oscillations of said signals to pulses coinciding with the peaks of amplitude of said oscillations, said pulses having the same polarity as said oscillations, means for comparing the instantaneous polarity of said pulses of each signal oscillation within each of said traces with the signal of said one trace, a plurality of trigger circuits, means for gating separate ones of said trigger circuits only when said pulses within said others of said traces are in phase with the instantaneous polarity of said one trace, means for detecting coincidence in the gating of all of said separate trigger circuits, means for rectifying each of said traces, means for comparing the rectified amplitude of said one trace with said others of said traces, means for gating said comparing means by said coincidence detector, and control means operated by said rectified amplitude comparison means for selecting information within said one trace.

18. Apparatus for selecting information representations within a plurality of reproducible record traces wherein at least one of said traces contains a predominant indication of said information and others of said traces contain lesser indications of said information comprising: means for producing an electrical signal representing the instantaneous amplitude and polarity of each of said traces, means for converting oscillations of said signals to pulses coinciding with the peaks of amplitude of said oscillations, said pulses having the same polarity as said oscillations, means for comparing the instantaneous polarity of said pulses of each signal oscillation within each of said traces with the signal of said one trace, a plurality of trigger circuits, means for gating separate ones of said trigger circuits only when said pulses within said others of said traces are in phase with the instantaneous polarity of said one trace, means for detecting coincidence in the gating of all of said separate trigger circuits, means for rectifying each of said traces, means for comparing the rectified amplitude of said one trace with said others of said traces, means for comparing the rectified amplitude of said one trace with a preestablished minimum and maximum reference amplitude, means for gating both of said comparing means by said coincidence detector, and control meanse operated only when both of said comparing means detect a rectified signal from said one trace which exceeds the rectified signals of said other trace in amplitude and is between said minimum and maximum reference amplitudes.

19. Apparatus for selecting information representations within a plurality of reproducible record traces wherein at least one of said traces contains a predominant indication of said information and others of said traces contain lesser indications of said information comprising: means for producing an electrical signal representing the instantaneous amplitude and polarity of each of said traces, means for converting oscillations of said signals to pulses coinciding with the peaks of amplitude of said oscillations, said pulses having the same polarity as said oscillations, means for comparing the instantaneous polarity of said pulses of each signal oscillation within each of said traces with the signal of said one trace, a plurality of trigger circuits, means for gating separate ones of said trigger circuits only when said pulses within said others of said traces are in phase with the instantaneous polarity of said one trace, means for detecting coincidence in the gating of all of said separate trigger circuits, means for rectifying each of said traces, means for comparing the rectified amplitude of said one trace with said others of said traces, means for comparing the rectified absolute amplitude of said one trace with a preestablished minimum and maximum reference amplitude, means for gating both of said comparing means by said coincidence detector, control means operated only when both of said comparing means detect a rectified signal from said one trace which exceeds the rectified signal of said other traces in amplitude and is between said minimum and maximum reference amplitudes, plotting means energized by said information in said one trace, and means for controlling the intensity of said plotting means by said control means from a fixed time prior to said correlation and for a fixed time after each operation of said control means.

20. In an apparatus for selecting information representations within a plurality of reproducible record traces wherein at least one of said traces contains a predominant indication of said information and others of said traces contain lesser indications of said information, means for comparing said one trace to said other traces during a preestablished period beginning with the instant an oscillation of said one trace reaches a maximum in either positive or negative polarity comprising: means for producing a series of first pulses for each of said one and said other traces coinciding in time with the peak of oscillations within each of said traces, means for comparing the instantaneous polarity of said first pulses within each of said series with the signal of said one trace to produce a series of single polarity second pulses for each of said one and said other traces when said first pulses and said one trace signal oscillations are of the same polarity, means for gating a trigger circuit by said second pulses to produce a series of separate uniform duration pulses for each of said one and said other traces, and means for comparing said separate uniform duration pulses produced by said one and said other traces for time coherence to select said information representations.

21. Apparatus for selecting information representations within a plurality of reproducible record traces containing indications of common information masked within nonrelated noise comprising: sensing means for determining the signal strength and sign of individual events on a first and neighboring individual directional seismic traces, first means for comparing the average strength of said sensed event signal on said first of said individual directional seismic traces with the average strength of said sensed event signal on directional seismic traces neighboring to and at each side of said first trace, first gating means operable by said first comparing means and operated when said event on said first trace exceeds said events on said neighboring traces in strength, second means for comparing sign and time coherence of said sensed event signal on said first trace with the sensed event signals on said neighboring traces, second gating means operable by said second comparing means and operated when said sensed signals cohere in sign and time, and circuit means serially connecting said individual gating means.

22. The apparatus of claim 21 including additional means for sensing the absolute event signal strength of said first trace, means for comparing said sensed event strength with a predetermined acceptance signal strength, a gating means operable by said comparing means and operated when said sensed event signal exceeds said predetermined signal strength, and circuit means for serially connecting said last-mentioned gating means with said relative amplitude and sign and time operated gating means.

23. Apparatus for detecting information representations within a plurality of separate signal record traces containing indications of common information comprising: first means for detecting signals exceeding a predetermined signal strength, second means for detecting signals in a particular trace exceeding signals on adjacent traces in amplitude, third means for detecting time coherence between said signals on said particular trace and similar signals on said adjacent traces, and control means being operated upon simultaneous detection of electrical signals on a particular trace satisfying each of said first, second and third detecting means.

24. An information display, means plotting intensity-control actuator providing at least two degrees of intensity control, one possible degree including zero intensity, and including means for controlling said actuator in response to representations of information within a plurality of reproducible record traces comprising: means for detecting the simultaneous satisfaction of absolute amplitude, relative amplitude and phase coherence criteria within certain of said record traces, means for energizing said display means with one of said record traces, means for controlling the intensity of display for said energizing trace in accordance with said detected representations, and relative time control means between said means for energizing and said intensity control to establish said degrees of intensity control for said energizing trace from a predetermined time interval before to a predetermined time interval after said representations detection.

25. A record trace comparison method for automatically selecting information representations along a plurality of side-by-side signal traces, wherein all of said signal traces are derived from the same source information and constitute a plurality of different summations of said information, adjacent traces of said signal trace summations being related to each other by a predetermined summation program comprising the steps of:

(a) continuously comparing the instantaneous signal strength and polarity of signals along the time axis of a first of said traces with
   (i) a fixed reference signal strength and simultaneously
   (ii) with the separate instantaneous signal strength and polarity of signals at the same times along at least two other signal traces adjacent and at opposite sides of said first trace, (b) and identifying said representations within said first trace by the simultaneous detection of
   (i) a signal strength in said first trace stronger than said reference signal strength,
   (ii) with the same signal in said first trace having a relative signal strength stronger than said signals at the same time along each of said other traces,
   (iii) and in sign coincidence with said signals at the same time along each of said other traces.

26. The method of claim 25 plus the additional step of initiating said identification at a predetermined period prior to said detection and for a predetermined period after said detection.

References Cited in the file of this patent

UNITED STATES PATENTS

| | | |
|---|---|---|
| 2,249,425 | Hansell | July 15, 1941 |
| 2,496,648 | Wolf | Feb. 7, 1950 |
| 2,693,862 | Rieber | Nov. 9, 1954 |
| 2,800,583 | Gerks | July 23, 1957 |
| 2,815,500 | Hance | Dec. 3, 1957 |
| 2,897,476 | Widess | July 28, 1959 |
| 2,897,477 | Lindsey | July 28, 1959 |
| 2,912,673 | Groenendyke | Nov. 10, 1959 |
| 3,018,468 | Jones et al. | Jan. 23, 1962 |